July 14, 1925.
T. M. CHANCE
1,545,637
METHOD FOR SEPARATING MATERIALS OF DIFFERENT SPECIFIC GRAVITIES
Filed Oct. 14, 1921
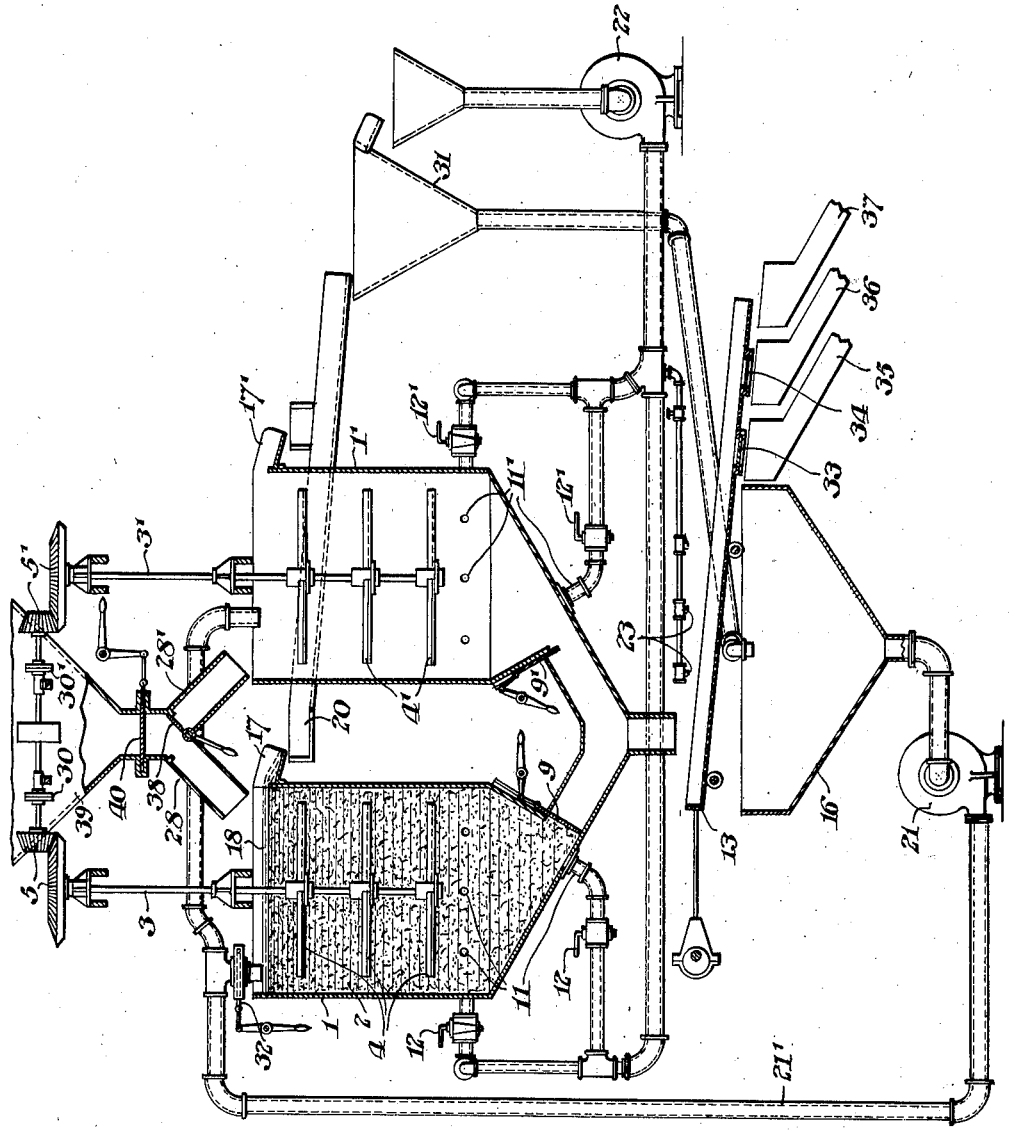
WITNESSES:
Carl K. Schulze
Frank H. Mills.
INVENTOR.
Thomas M. Chance

Patented July 14, 1925.

1,545,637

UNITED STATES PATENT OFFICE.

THOMAS M. CHANCE, OF PHILADELPHIA, PENNSYLVANIA.

METHOD FOR SEPARATING MATERIALS OF DIFFERENT SPECIFIC GRAVITIES.

Application filed October 14, 1921. Serial No. 507,606.

*To all whom it may concern:*

Be it known that I, THOMAS M. CHANCE, a citizen of the United States, residing at Philadelphia, in the State of Pennsylvania, have invented certain new and useful Improvements in Methods for Separating Materials of Different Specific Gravities, whereof the following is a specification.

My invention is an improvement in method for separating materials of different specific gravities, employing a medium to effect separation similar to that described in U. S. Patent No. 1,224,128 issued to me May 1, 1917, wherein separation is effected by an agitated mixture of liquid and comminuted solid matter constituting a fluid mass having a specific gravity greater than that of some of the materials to be separated and less than that of other of said materials, separation being effected by the sinking of the heavier materials and the floating of the lighter materials in said fluid mass. The character of the fluid mass used in my present invention and the way in which separation is effected are similar to that disclosed in the above mentioned patent, but in my present invention I permit the comminuted solid matter to settle and the fluid mass to partially or wholly lose its fluidic characteristics before removing the separated materials.

In describing my present invention I will use the word sand to mean any suitable comminuted solid insoluble matter of greater specific gravity than the liquid used and the word water to mean any suitable liquid, and I will describe the operation of the method as applied to the separation of coal from slate, (the term slate to include other impurities such as rock, bony coal, pyrite, etc.,) as such description will enable those familiar with ore dressing to apply my invention to the concentration of ores or to the separation of other materials.

In separating coal from slate I produce a fluid mass by agitating a mixture of sand (quartz, magnetite, or other suitable substance) and water in proper proportions to secure a fluid mass of the desired gravity. The particles of sand should be of such size and shape as to sink readily when agitation of the fluid mass ceases. The fluid mass may be introduced into the receptacle in which separation is to be effected as an agitated fluid mass ready for use, or the sand and water may be introduced into said receptacle and the mixing effected by agitation produced by any suitable means. If the fluid mass be prepared ready for use before its introduction into the receptacle, the coal and slate to be separated may be fed into the receptacle with the fluid mass. If the fluid mass is prepared ready for use in the receptacle, the coal and slate can be fed into it as soon as it attains the desired specific gravity and the necessary fluidity, or the sand, water, coal and slate may be placed in the receptacle and the fluid mass produced by agitating the mixed materials. Agitation of the fluid mass is then diminished or discontinued, the slate quickly sinks to the bottom of the fluid mass, the sand settles, a portion of the water collects above the sand, or is drained away below it, and the coal occupies a position upon the top and embedded in the upper part of the sand. The lower part of the sand with the slate and the upper part of the sand with the coal are then separately removed, and the sand is separated from each by screening or washing or both and is thus recovered for further use.

It will be understood from the above description that the method is a "batch" process of treatment, a definite quantity of material being introduced for separation each time a batch of the fluid mass is used in the receptacle.

In carrying out this method of separation, I find that a fluid mass of the proper character does not lose its fluidic properties immediately after agitation and mixing is discontinued, because the kinetic energy imparted to it in preparing it for use is not immediately dissipated, agitation from this source of energy continuing for some time, and its fluidic properties will thus continue, decreasing and finally disappearing as this kinetic energy and movement disappear, the sand settling and a portion of the liquid rising to form a body of clear liquid above the sand. The kinetic energy developed by the settling of the grains of sand produces agitation by forcing water up through the fluid mass and thus prolongs the period during which fluidity of a part of the fluid mass is maintained. The introduction of the coal and slate to be separated produces additional agitation, further prolonging the period of fluidity, and the falling of the slate through the fluid mass produces pronounced agitation, eddy currents and circulation, and further, as each particle of slate in falling displaces an equal volume of the fluid mass upwardly, the fluid mass as a whole is raised bodily by a distance equal to the volume of slate which falls through it, thus producing agitation which prolongs the period during which the fluidic properties of the fluid mass are retained.

In some cases it may be advantageous to continue mechanical or hydraulic agitation during the period in which the coal and slate are introduced, thus increasing the quantity of coal and slate that can be separated by each batch of the fluid mass, then decreasing or discontinuing the agitation to permit the sand to settle before the separate removal of the separated materials as already described.

It will be understood that after separation is effected and the sand has settled, the coal will be found on top of the sand and mixed through the upper portion of the sand and the slate will be found at the bottom of the sand and mixed through the lower portion and any material of intermediate specific gravity whose specific gravity approximates that of the fluid mass will be found mixed through the sand between the region occupied by coal and that occupied by slate and may be separately removed, to be added to the coal, or to the slate, or for crushing and retreatment for the recovery of coal attached to, or interlaminated with slate. In carrying out my method it will be found that as agitation of the fluid mass decreases and the settlement of sand commences, the specific gravity of the fluid mass increases, this increase in specific gravity tending to float or to bring to the upper part of the fluid mass pieces of heavy coal and "bony" coal, the specific gravity of which is nearly equal to that of the fluid mass as prepared for use and which therefore was not heavy enough to sink or light enough to float during the separating period.

In carrying out my invention I do not confine myself to the particular form of apparatus shown by the drawings as it is evident that the described method of separation can be carried out in a receptacle of any desired shape or form, and that the separated materials and the sand may be removed from the receptacle by hand, or by flushing, or by any types of excavating or conveying apparatus such as are in common use for excavating, unloading and transporting materials. It is also evident that means similar to those I have shown and described in U. S. Patent No. 1,224,138 above mentioned and in U. S. Patent No. 1,392,399 issued to me Oct. 4, 1921, may be used for producing by agitation a fluid mass of the desired character, and for removing the separated materials from the apparatus.

The figure of the drawing is a vertical elevation and partly cross-sectional view of an apparatus in which my method can be carried out, including appliances for the separation of the sand and water from the coal and slate after their removal from the receptacle in which the method is carried out, and for the return of the sand and water to a storage tank or to a second separating receptacle.

The drawing shows two such separating receptacles, 1 and 1', each equipped with an agitating shaft 3 and 3', with stirring arms 4 and 4', and gears 5 and 5' for operating the shafts 3 and 3', these gears being driven through clutches 30 and 30' so that either agitator can be stopped at any time. The receptacle 1 is shown filled with fluid mass 2 indicated by stippling, surplus water 18 being shown above fluid mass 2 with an outlet and apron 17 for the discharge of surplus water. The bottom of receptacles 1 and 1' are provided with discharge outlets controlled by gates 9 and 9' for the control of material being discharged, and the flow of material is further regulated by hydraulic jets 11 and 11' controlled by cocks or valves 12 and 12' which may be used to flush out material that would otherwise not flow out, or that would flow out at too slow a speed. The surplus water discharged from 17, is conveyed by conduits 20 to a settling tank 31, the clear water overflowing from which feeds pump 22 from which it is distributed by conduits to hydraulic jets 11, 11' and water spray nozzles 23, while sand settling in 31 is piped as shown to sand tank 16, from which it is pumped by pump 21, through conduit 21' to receptacle 1 when valve 32 is open and to receptacle 1' when valve 32 is closed. Materials discharged through gates 9 and 9' are separated by shaking screen 13 which allows the sand and water to pass through into sand tank 16 which is large enough to hold the excess of water and sand which is displaced from 1 or 1' when coal and slate are fed into either of these separating receptacles. The coarser separated material which does not pass through screen 13 is passed through apertures 33 or 34 or is discharged from the end of the screen when apertures 33 and 34 are closed. Each of these apertures is provided with a removable plate, not shown, by which either or both may be closed to prevent material from passing through them. Material passing through apertures 33, 34, or passing out at this end of the screen falls into chutes 35, 36 and 37 respectively. Feeding chutes for introducing materials to be separated are shown by 28 and 28', the materials being diverted into either by flap valve, 38, the charge to be separated being drawn from feed pocket 39 by opening the controlling feed valve 40.

In operating the apparatus, 1 is filled with a fluid mass 2 of the described type, a batch of coal and slate is drawn from pocket 39 into 1, and after a short interval the slate sinks, the agitator 3 is then stopped and the sand allowed to settle, the gate 9 is now opened and sufficient hydraulic water passed through jets 11 to flush the sand and slate out upon the screen 13, and the slate is discharged through aperture 33 into chute 35. The gate 9 is now closed and the aperture 33 is closed by inserting a plate, or by covering it with a plate. The gate 9 is now opened and heavy and impure coal and interlaminated coal and slate is discharged, (aided by hydraulic jets 11) upon the screen 13 and passes through aperture 34 to chute 36. When all of this material is discharged gate 9 is closed and aperture 34 is closed by a plate; gate 9 is then opened and the coal and sand are flushed out upon screen 13, the coal passing out over the end of this screen to chute 37. During all of this period during which material is being drawn from 1 the sand and water accumulating in sand tank 16 is being pumped by pump 21 into receptacle 1' so that when the emptying of 1 is finished 1' is filled with a fluid mass ready to receive and separate a batch of coal and slate. The operation of 1' is then conducted exactly as that described in operating 1, the two receptacles 1 and 1' being thus operated alternately; the one being filled with fluid mass during the period in which materials are being drawn out of the other.

It will of course be evident that two separating receptacles are not necessary in carrying out my invention, as the sand and water accumulating during the discharge period may be stored in a storage tank preparatory to their transfer back into the separating receptacle.

The production and maintenance of a fluid mass of the required character may be effected by any methods used for the production of such fluid masses, which do not necessarily require the use of mechanical agitators, agitation by mixing, by pouring or by hydraulic water, either with or without mechanical agitators, may be used to effect the desired result and such agitation or mixing may be carried out either inside or outside the receptacles in which separation is effected. I therefore do not confine myself to the type of apparatus or to the devices, or adjunctive appliances shown by the drawing.

Having described my invention, I claim:

A method for separating materials of different specific gravities by means of a fluid mass consisting of an agitated mixture of liquid and comminuted solid matter insoluble in said liquid, said fluid mass having a specific gravity greater than that of some and less than that of other of the materials to be separated, which consists of introducing said materials into said fluid mass, in maintaining the specific gravity of said fluid mass to cause the lighter material to float and the heavier material to sink in said fluid mass, in decreasing the agitation of said fluid mass, thus increasing the specific gravity in said fluid mass and causing material of intermediate specific gravity and material of lighter specific gravity floating in the lower part of said fluid mass to rise and float in the upper part of said fluid mass and in separately removing the heavier material from the lower part of said fluid mass and the lighter material from the upper part of said fluid mass.

THOMAS M. CHANCE.

Witnesses:
H. M. CHANCE,
CARL K. SCHUTZE.